US008456863B2

(12) United States Patent
Wu

(10) Patent No.: US 8,456,863 B2
(45) Date of Patent: Jun. 4, 2013

(54) HYBRID SERVICE DEVICE AND SYSTEM

(75) Inventor: Hsi-Mien Wu, Taipei (TW)

(73) Assignee: Equaline Corp., Taipei (TW)

(*) Notice: Subject to any disclaimer, the term of this patent is extended or adjusted under 35 U.S.C. 154(b) by 368 days.

(21) Appl. No.: 12/946,018

(22) Filed: Nov. 15, 2010

(65) Prior Publication Data
US 2011/0141713 A1 Jun. 16, 2011

(30) Foreign Application Priority Data

Dec. 11, 2009 (TW) .............................. 98142507 A

(51) Int. Cl.
H05K 7/02 (2006.01)
H05K 7/00 (2006.01)
H05K 1/14 (2006.01)
H01R 13/66 (2006.01)

(52) U.S. Cl.
USPC ........... 361/810; 361/760; 361/784; 361/803; 361/807; 361/809; 439/620.06; 439/620.12

(58) Field of Classification Search
USPC ......... 361/760, 784, 785, 803, 807, 809–810; 439/620.06, 620.12, 620.16, 676
See application file for complete search history.

(56) References Cited

U.S. PATENT DOCUMENTS

| 6,139,360 | A | * | 10/2000 | Hayashi et al. | ............... 439/502 |
|---|---|---|---|---|---|
| 6,833,998 | B2 | * | 12/2004 | Chuang et al. | ................ 361/803 |
| 6,881,096 | B2 | * | 4/2005 | Brown et al. | ............ 439/620.01 |
| 6,976,877 | B2 | * | 12/2005 | Lien | .......................... 439/620.01 |
| 7,044,750 | B1 | * | 5/2006 | Lin | ............................. 439/76.1 |
| 2005/0181643 | A1 | * | 8/2005 | Brower et al. | ............... 439/76.1 |
| 2007/0015416 | A1 | * | 1/2007 | Gutierrez et al. | ............. 439/676 |
| 2007/0072473 | A1 | * | 3/2007 | Wang et al. | .................... 439/326 |
| 2007/0254530 | A1 | * | 11/2007 | Martich et al. | ................ 439/676 |

* cited by examiner

Primary Examiner — Timothy Thompson
Assistant Examiner — Sherman Ng
(74) Attorney, Agent, or Firm — Thomas | Horstemeyer, LLP

(57) ABSTRACT

A hybrid service device, which can be embedded in a wall, includes a control module disposed on a first circuit board, a transmission functional module disposed on a second circuit board, and a service module disposed on a third circuit board. The control module includes a first circuit board connector and a socket, wherein the second circuit board is pluggable disposed on the socket, such that the first circuit board and the second circuit board are substantially parallel and the control module is electrically connected with the transmission functional module. The service module includes a second circuit board connector, wherein the third circuit board is pluggable connected with the first circuit board connector. The hybrid service device is connected with a first signal transmission line from the wall for receiving a transmission signal with a first format, and the hybrid service device selectively transform the first format to a second format and then transmits the transmission signal with the second format to an external access equipment by wired/wireless transmission.

13 Claims, 10 Drawing Sheets

HYBRID SERVICE DEVICE AND SYSTEM

CROSS-REFERENCE TO RELATED APPLICATION

Figure 1A:
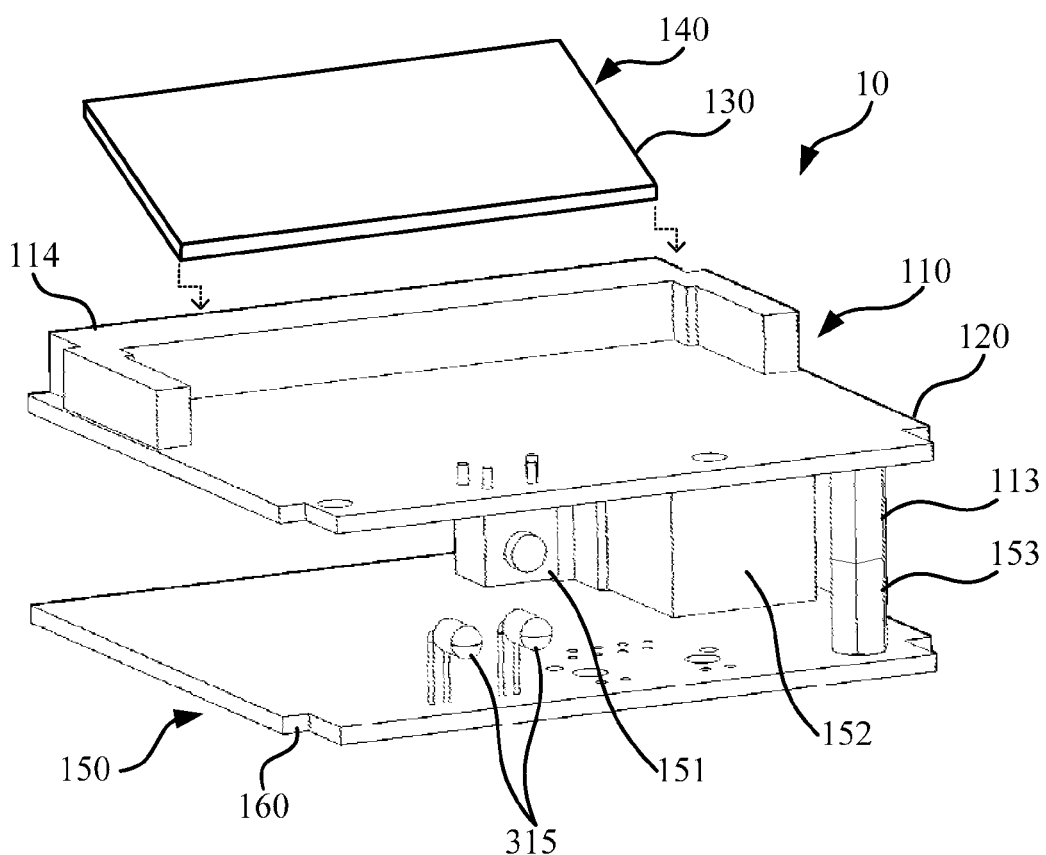

This application claims priority to Taiwan patent application entitled "HYBRID SERVICE DEVICE AND SYSTEM," having serial number 098142507, filed on Dec. 11, 2009, which is incorporated by reference in its entirety.

BACKGROUND OF THE INVENTION

1. Field of the Invention

The invention is related to a hybrid service device and system. More particularly, the invention is related to the wireless signal transmission hybrid service device and system.

2. Description of the Prior Art

When the general apartment needs to install WiFi wireless access point, each household has to install the ADSL Modem provided by the network service company or the Cable Modem provided by the cable TV company. Then, each household shall buy an external suspension wireless access point device to connect with the ADSL Modem or the Cable Modem. Such that the notebook or other WiFi wireless communication function mobile devices can connect the internet by the wireless access point. However, the external suspension of the wireless devices needs at least two cables (one power line, a network cable), such that the cables will often affect the visual effect of the cable settlement. Additionally, the size of the external suspension wireless access point device is not small to settle.

Furthermore, besides the WiFi, the wireless transmission protocol comprises the Bluetooth wireless transmission protocol, RFID wireless transmission protocol, Zeebee wireless transmission protocol, 3G/3.5G wireless transmission protocol, Wimax wireless transmission protocol or some wired transmission protocol. However, general wireless access point only supports the WiFi wireless transmission protocol. If the users want to use other wireless transmission protocol, they shall install the different access devices and it is hard to use.

SUMMARY OF THE INVENTION

Accordingly, one aspect of the invention is to provide a hybrid service device which can be embedded in a wall. The hybrid service device comprises a main control module disposed on a first circuit board, a transmission functional module disposed on a second circuit board and a service module disposed on a third circuit board.

In view of the mechanism, the control module comprises a board connector and a socket, wherein the second circuit board is pluggably disposed on the socket, such that the first circuit board and the second circuit board are substantially parallel and the control module is electrically connected with the transmission functional module. The service module includes a second circuit board connector which is pluggably connected with the first circuit board connector, such that the service module is electrically connected to the control module.

In view of the circuit signal process, the control module comprises a CPU and a non-volatility memory device. The non-volatility memory device is connected to the CPU for saving an instruction set. The CPU initializes the hybrid service device according to the instruction set and controls the hybrid service device. Furthermore, the transmission functional module is controlled by the control module to provide a wired/wireless transmission service for a wireless access equipment. The service module comprises a format converter and a first wired network connector, wherein the first wired network connector is connected to the first signal transmission line for receiving a transmission signal.

The format converter is electrically connected with the first wired network connector to selectively transform the first format to a second format. Then, the service module transmits the transmission signal with the second format to the control module through the second circuit board connector and first circuit board connector. The transmission functional module, controlled by the control module, transmits the second format transmission signal to an external access equipment.

Furthermore, the service module can comprise a second wired network connector which is disposed on a third circuit board. The second wired network connector, connected to a second signal transmission line, selectively transmits the first format transmission signal or a second format transmission to the second signal transmission line, so that the wired external access equipment can receive the first format transmission signal or the second format transmission signal by the second signal transmission line.

The other aspect of the invention is to provide a source to the hybrid service device by the first format transmission signal. For example, when a first format transmission signal is a POE (Power Over Ethernet) signal or POC (Power Over Cable) signal. The service module further comprises a power source convert device which is disposed on the third circuit board. The power source convert device receives the first format transmission signal from the first wired network connector and captures the source signal from the first format transmission signal. The power source convert device generates a voltage signal according to the source signal for supplying with the hybrid service device.

The objective of the present invention will no doubt become obvious to those of ordinary skill in the art after reading the following detailed description of the preferred embodiment, which is illustrated in following figures and drawings.

BRIEF DESCRIPTION OF THE APPENDED DRAWINGS

Figure 1B:
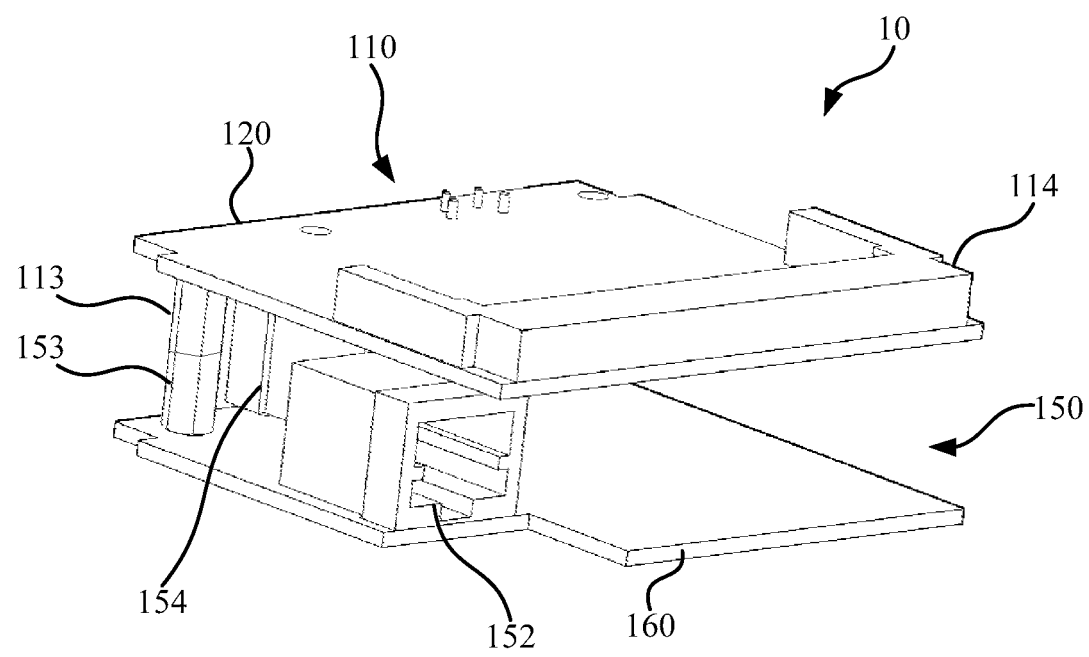

FIG. 1(a) to FIG. 1(b) are structure charts of inside circuit boards of the hybrid service system according to one embodiment of the invention.

Figure 2A:
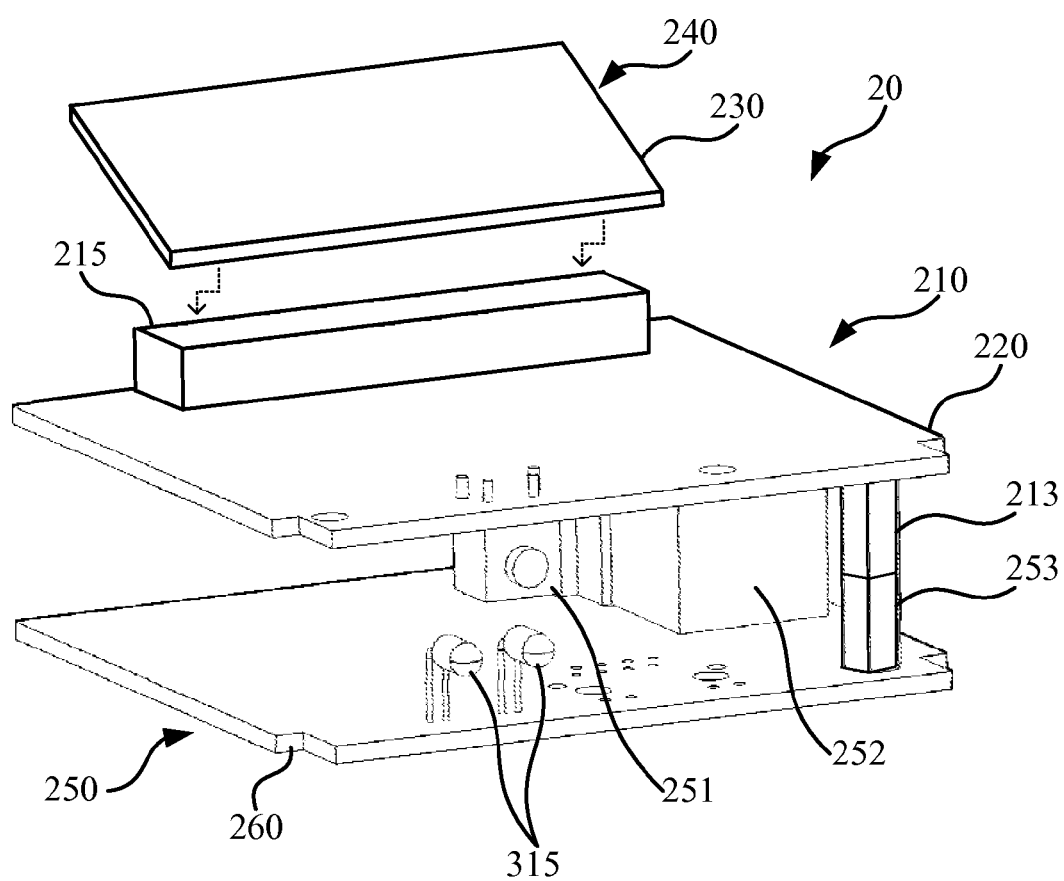
Figure 2B:
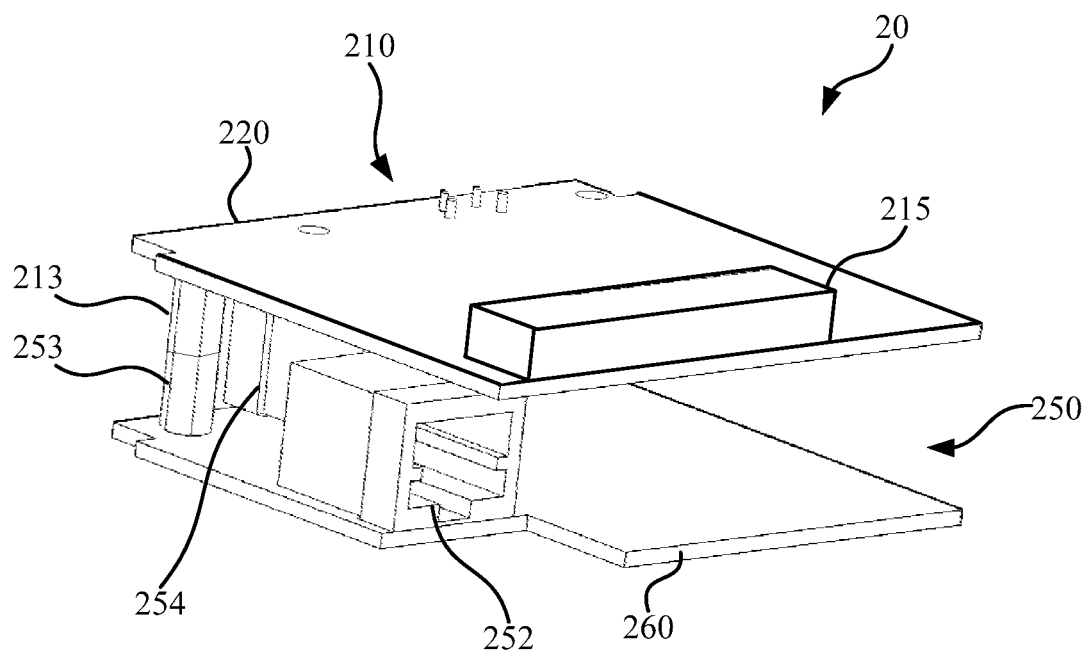
Figure 3A:
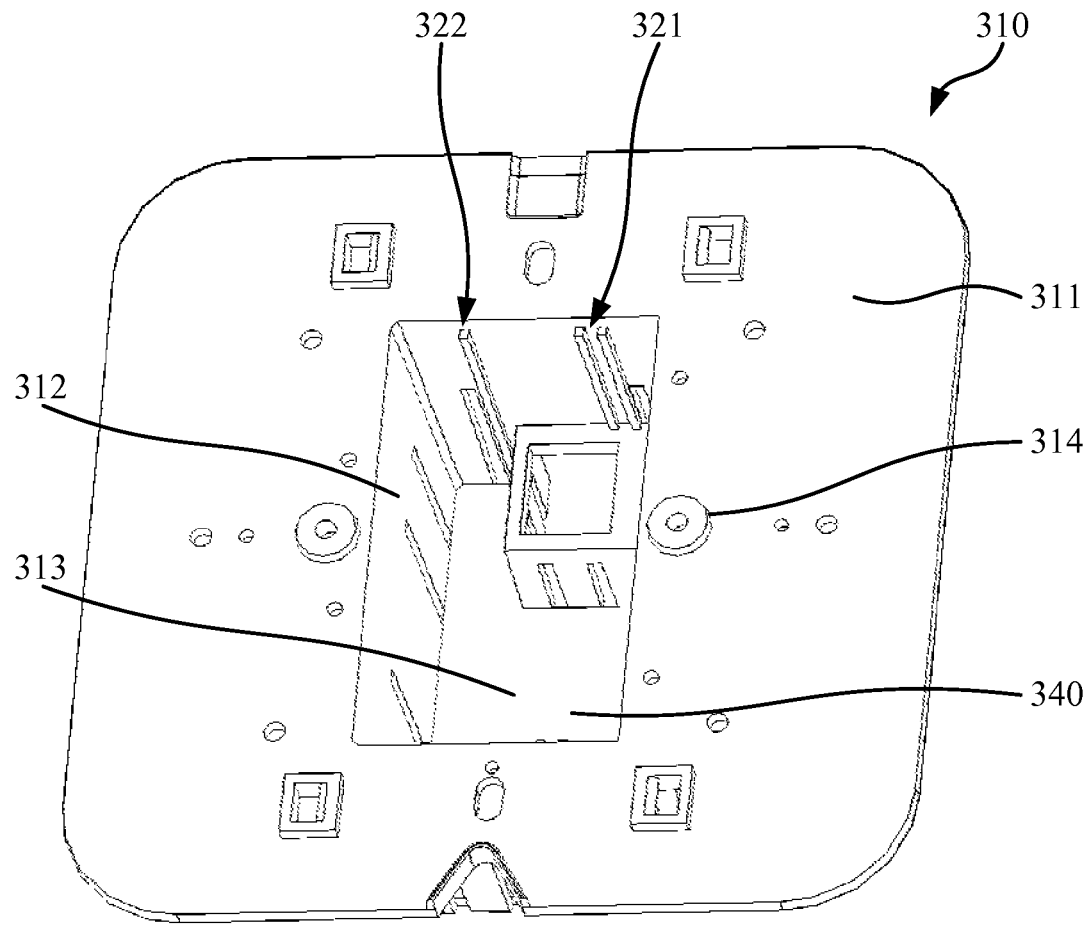
Figure 3B:
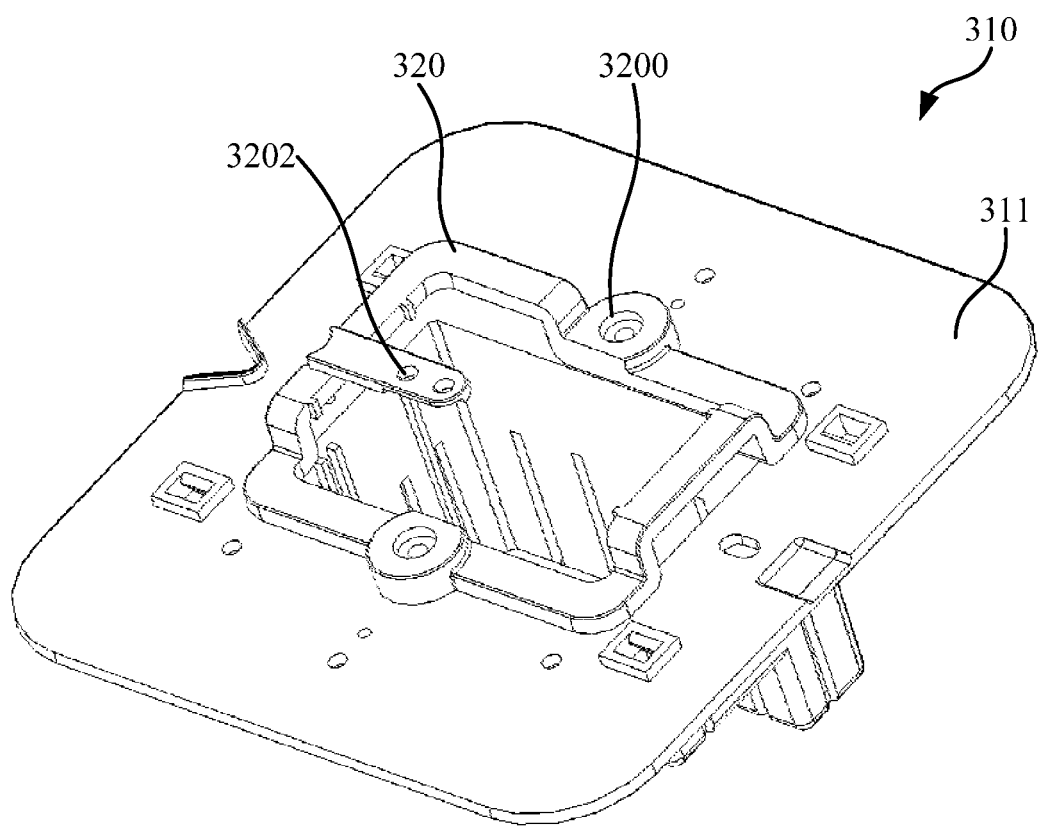
Figure 3C:
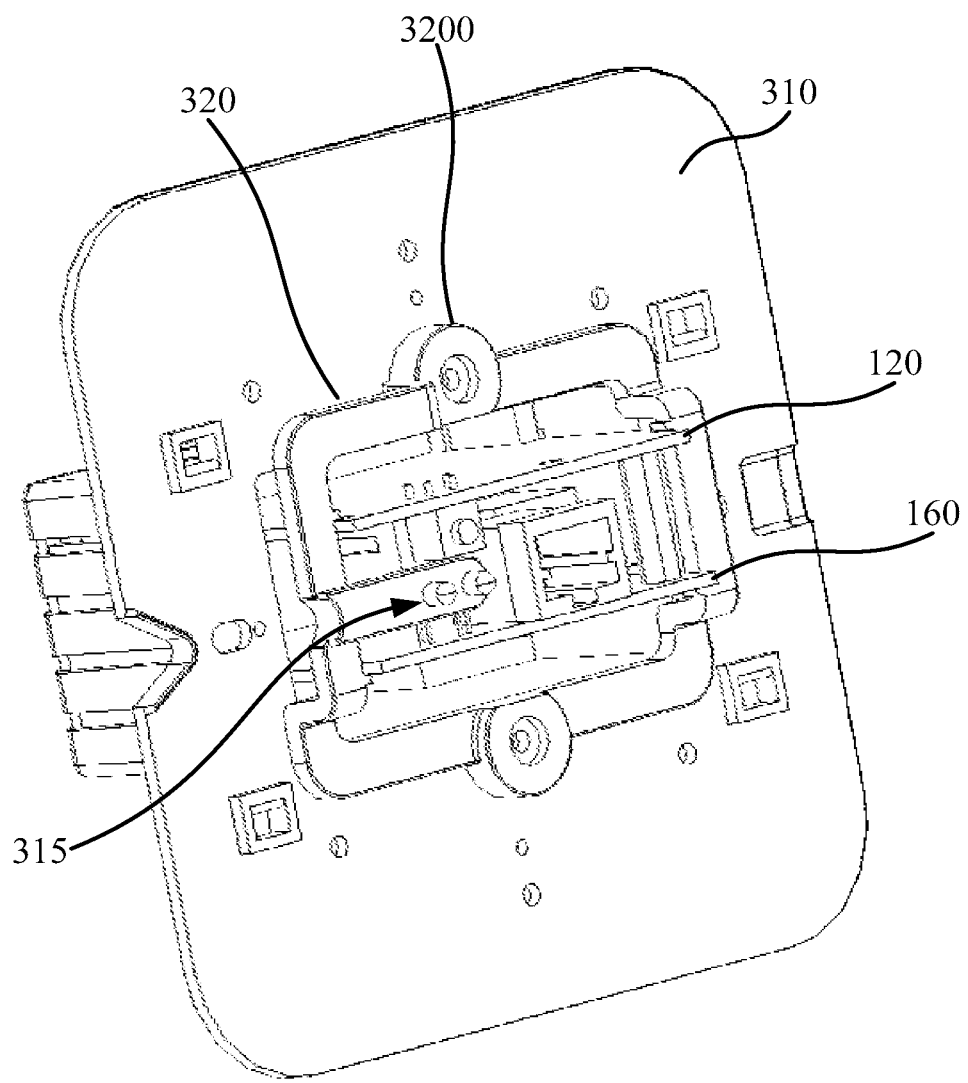
Figure 3D:
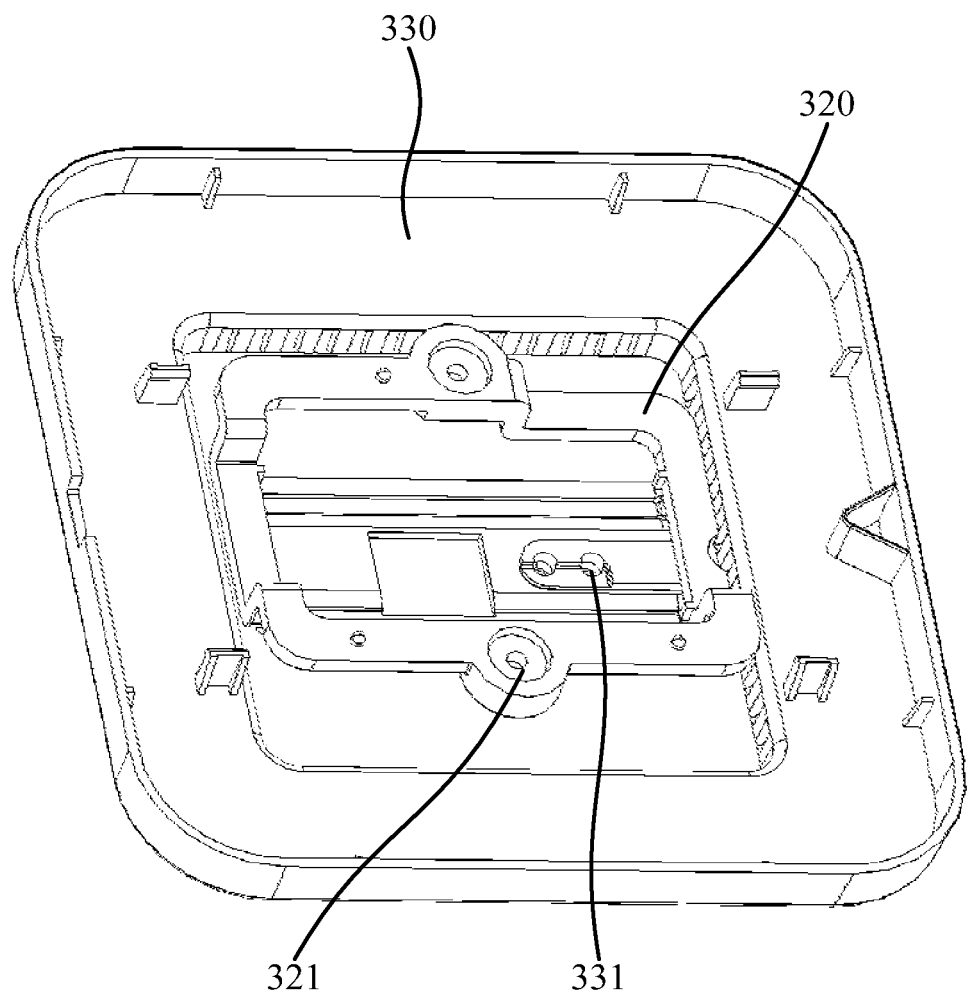
Figure 3E:
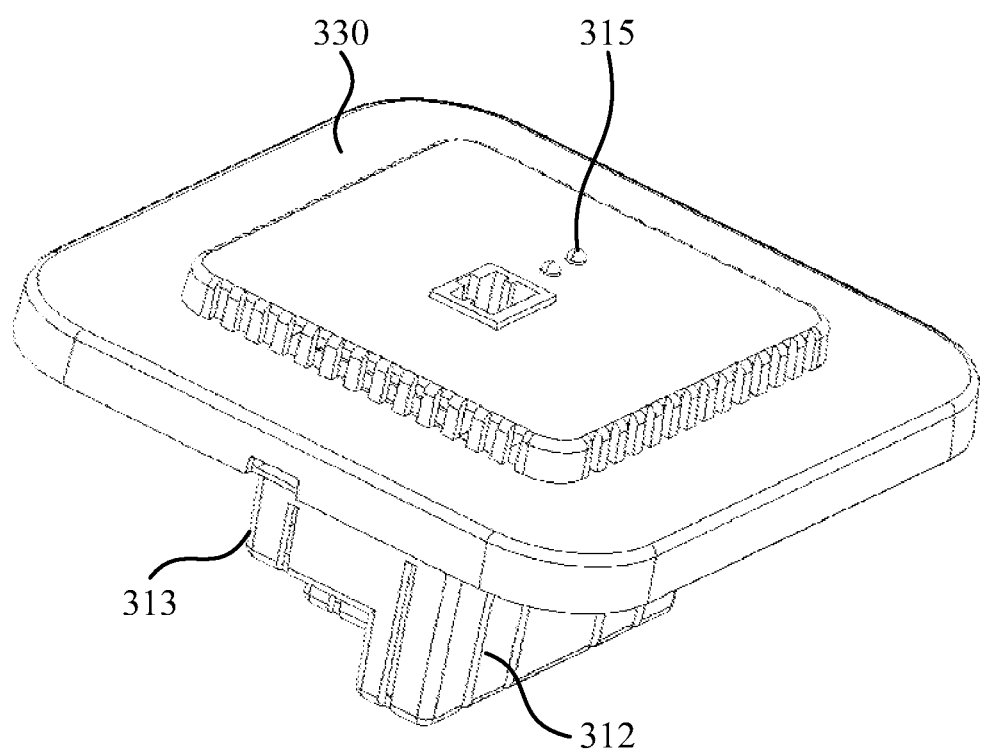

FIG. 2(a) to FIG. 2(b) are structure charts of inside circuit boards of the hybrid service system according to another embodiment of the invention.

FIG. 3(a) to FIG. 3(e) are schematic diagrams of the shell of the hybrid service system according to another embodiment of the invention.

Figure 4:
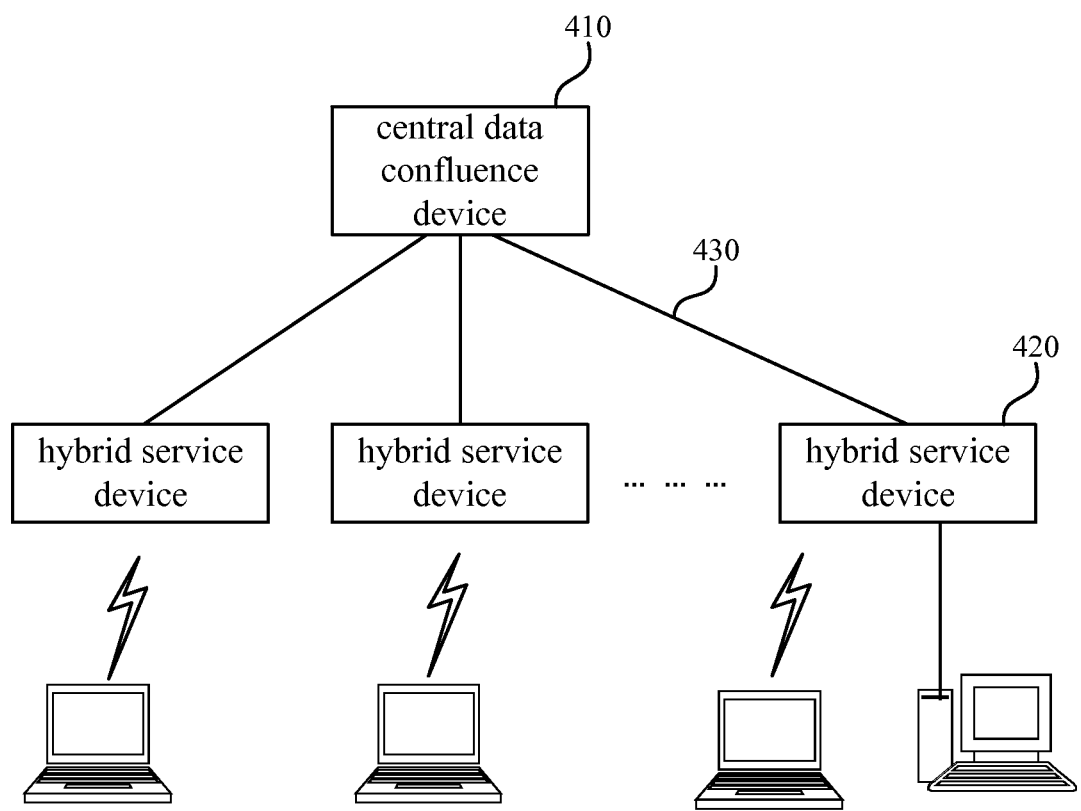

FIG. 4 is a schematic diagram of the hybrid service system according to one embodiment of the invention.

DETAILED DESCRIPTION OF THE INVENTION

The hybrid service device is embedded in a wall and connected to the first signal transmission line from the wall. The first signal transmission line can be an Ethernet transmission line, a coaxial cable line, a twisted wire or a power line which can transmit the data signal. Transmitting the data to the hybrid service device through the first signal transmission line and then the hybrid service device transmits the data to a wired/wireless external access equipment such as a notebook or a PDA.

Please refer to FIG. 1(a) to FIG. 1(b). FIG. 1(a) to FIG. 1(b) are structure charts of inside circuit boards of the hybrid service system 10 according to one embodiment of the invention. The hybrid service device 10 comprises a control module 110 disposed on a first circuit board 120, a transmission functional module 130 disposed on a second circuit board 140 and a service module 150 disposed on a third circuit board 160. The control module 110 comprises a CPU (not shown in FIG.), a non-volatility memory device (not shown in FIG.), a first circuit board connector 113 and a socket 114. The non-volatility memory device is connected to the CPU for saving an instruction set. When the hybrid service device 10 is turned on or reset, the CPU initializes the hybrid service device 10 according to the instruction set and controls the hybrid service device 10. When the hybrid service device 10 is in the general working status, the related circuit of the hybrid service device 10 is controlled by the CPU according to the instruction set to let the hybrid service device 10 receive or transmit the related data. Additionally, the control module 110 can comprise a reset switch (not shown in FIG), disposed on the first circuit board, for resetting the hybrid service device when the reset switch is "ON".

Next, the transmission functional module 130 of the second circuit board 140 is pluggably disposed on the socket 114, such that the first circuit board 120 and the second circuit board 140 are substantially parallel and the control module 110 is electrically connected with the transmission functional module 130. The transmission functional module 130 can provide a wireless transmission service for the external wireless access equipment. The external wireless access equipment can be a notebook or a PDA which has wireless transmission function. The service provided by the transmission functional module can be a WiFi service, a Bluetooth service, a RFID service, a Zeebee service, a 3G/3.5G transmission service or a Wimax service. The circuit design of the transmission functional module 130 and second circuit board 140 are different. The transmission functional module 130 and second circuit board 140 are electrically connected to the control module 110 and the first circuit board 120 according to the actual need by the socket 114 which is disposed on the first circuit board 120, such that the function expansion and replacement of the hybrid service device 10 can be increased.

The service 150 comprises a format converter 151, a first wired network connector 152 and a second circuit board connector 153. The second circuit board connector 153 is pluggably connected with the first circuit board connector 113 control module 110 for letting the service module 150 electrically be connected with the control module 110, wherein the first circuit board connector 152 and the second circuit board connector 153 can be pins or signal connectors which are corresponded to the PCI interface, USB interface or RS232 interface.

The first wired network connector 152 provides a connector accommodating space for connecting a first signal transmission line and receiving a first format transmission signal from the signal transmission line. When the first signal transmission line is an Ethernet transmission line, the wired network connector 152 can be a RJ-45 connector which is coupled to the Ethernet transmission line. The format converter 151 is electrically connected with the wired network connector 152 and selectively converts the first format transmission signal to a second format transmission signal. For example, when the first signal transmission line is the Ethernet transmission line, the first format transmission signal shall meet the IEEE802.3 format. When the transmission functional module 130 provides the WiFi wireless transmission service, the format converter 151 will transform the first format transmission signal of the IEEE802.3 format to the second format transmission signal of the IEEE802.11x format.

The service module 150 transmits the second format transmission signal to the control module 110 through the second circuit board connector 153 and the first circuit board connector 113. The control module 110 controls the transmission functional module 150 to transmit the second format transmission signal to the wireless access equipment, such as a notebook or a PDA which has which has wireless transmission function. Additionally, the service module 15 can directly transmit the first format transmission signal to the external wired access equipment, such as a PC which has network line. For example, the service module 150 further comprises a wired network connector 154 which is disposed on the third circuit board 160. The second wired network connector 154 is connected to the second signal transmission line. The second signal transmission line can be an Ethernet transmission line, a coaxial cable line, a twisted wire or a power line. When the first signal transmission line and the external second signal transmission line are the same, taking the Ethernet transmission line for example, the service module 150 transmits the first format transmission signal to the external second signal transmission line and the external wired access equipment. When the first signal transmission line is different from the external second signal transmission line, the service module 150 transforms the first format transmission signal to a third format transmission signal, then the service module 150 transmits the third format transmission signal to the second signal transmission line.

Additionally, the power of the hybrid service device 10 can be received via a POE (Power Over Ethernet) signal or a POC (Power Over Cable) signal. When the first signal embedded in the wall is an Ethernet transmission line, the power source can be added in the Ethernet transmission line, such that the first format transmission signal can be a POE (Power Over Ethernet) signal. For example, transmitting the 44-57V DC signal to the service module 150 through the Ethernet transmission line, 48V source signal is one embodiment in the invention. When the first signal embedded in the wall is a coaxial cable line, the power source can be added in the coaxial cable line, such that the first format transmission signal can be a POC (Power Over Cable) signal. For example, transmitting the 44-57V DC signal to the service module 150 through the coaxial cable line, 48V source signal is one embodiment in the invention. At the same time, the service module 150 further comprises a power source convert device (not shown in FIG) which is disposed on the third circuit board 160, the power source convert device receives the first format transmission signal from the first wired network connector 152 and captures a 48V source signal from the first format signal. The power source convert device produces a voltage signal (5V or 12V DC signal) for the use of the hybrid service device 10. Of course, in another embodiment, the power of the hybrid service device 10 is provided from the power line which is embedded in the wall. At the same time, the service module 150 comprises the power source convert device disposed on the third circuit 160. The source convert device captures the voltage source from the voltage source line and generates a set of voltage signals for the use of the hybrid service device 10 accordingly.

Please refer to FIG. 2(a) to FIG. 2(b), FIG. 2(a) to FIG. 2(b) are structure charts of inside circuit boards of the hybrid service system according to another embodiment of the invention. The hybrid service device 20 comprises a control module 210 disposed on a first circuit board 220 and a service module 250 disposed on a third circuit board 260. The control module 210 comprise a CPU (not shown in FIG.), a non-volatility memory device (not shown in FIG.), a first circuit board connector 213, a third circuit board connector 215, a WiFi transmission module (not shown in FIG.) and a format converter (not shown in FIG.), wherein the function of the non-volatility memory device, the CPU and the first circuit board connector 213 are described as previously. The WiFi transmission module provides a wireless transmission service which meets the IEEE802.11. When the hybrid service device 20 in the general working status, the WiFi transmission module and the hybrid service device 20 are controlled by the CPU according to the instruction set, to let the hybrid service device 20 receive or transmit the related data. That is to say, the control module 210 of the hybrid service device 20 provides a function of the access point (AP).

The service module 250 comprises a first wired network connector 252 and a second circuit board connector 253. The second circuit board connector 253 is pluggable connected to the first circuit board connector 21 of the control module 210, such that the control module 250 is electrically connected with the control module 210. The first wired network connector 252 and the second circuit board connector 253 can be pins or the signal connectors which are corresponded to the PCI interface, USB interface or RS232 interface. The first wired network connector 252 provides a connector accommodating space for connecting a first signal transmission line and receiving a first format transmission signal from the signal transmission line. When the first signal transmission line is an Ethernet transmission line, the wired network connector 252 can be a RJ-45 connector which is coupled to the Ethernet transmission line. The service module 250 transmits the first format transmission signal to the control module 210 through the second circuit board connector 253 and the first circuit board connector 213.

The format convertor of the control module 210 selectively transforms the first format transmission signal to the second format transmission signal and then transmits the second format transmission signal to a wireless external access equipment by the WiFi transmission module of the control module 210, such as notebooks or PDAs which have the wireless transmission function. For example, when the first signal transmission line is an Ethernet transmission line, the first format transmission signal shall meet the IEEE802.3 format. The format converter transforms the first format transmission signal of the IEEE802.3 function to the second format transmission signal of the IEEE802.11x function for the use of the WiFi transmission module.

In one embodiment, the service module 250 can directly transmits the first format transmission signal to the external wired access equipment, such as PC. For example, the service module 250 can comprises a second wired network connector 254 which is disposed on the third circuit board 260, wherein the second wired network connector 254 is used to the external second signal transmission line. The second signal transmission line can be an Ethernet transmission line, a coaxial cable line, a twisted wire or a power line which has data signals. When the first signal transmission line and the external second signal transmission line are the same, taking the Ethernet transmission line for example, the service module 250 transmits the first format transmission signal to the external second signal transmission line and the external wired access equipment. When the first signal transmission line is different from the external second signal transmission line, the service module 250 transforms the first format transmission signal to a third format transmission signal and then the service module 250 transmits the third format transmission signal to the second signal transmission line.

In the embodiment of the hybrid service device 20, the control module 210 can be connected to the additional transmission functional module 230 by the third circuit board connector 215 for expanding the function of the hybrid service device 20. The transmission functional module 230, disposed on the second circuit board 240, can provide a wireless transmission device. According to the difference of the wireless transmission devices, the wireless transmission device provided by the transmission functional module 230 can be a Bluetooth wireless transmission device, a RFID wireless transmission device, a Zeebee wireless transmission device, a 3G/3.5G wireless transmission device or a Wimax wireless transmission device. The circuit design of the transmission functional module 230 and the second circuit board 240 are different according to the wireless transmission devices. The second circuit board 240 of the transmission functional module 230 can be electrically connected to the control module 210 and the first circuit board 220 by the third circuit board connector 215 which is disposed on the first circuit board 220, such that the expansion of the hybrid service device 20 can be increased. The third circuit board connector 215 of the control module 210 can be the socket 114, such that the second circuit board 240 of the transmission functional module 230 is pluggable disposed on the socket 114. Additionally, the third circuit board connector 215 of the control module 210 can be a general pins or a signal connector which are corresponded to the PCI interface, USB interface or RS232 interface, for the electric connection of the second circuit board 240 of the transmission functional module 230. When the third circuit board connector 215 is a general pin, the second circuit board 240 of the transmission functional module 230 can be connected to the third circuit board connector 215 of the control module 210, such that the transmission functional module 230 can be disposed on the notches of the accommodating shell flexibly.

Additionally, the transmission functional module 230 can not only provide the wireless transmission function, but also other function such as voice over IP (VOIP) function. As shown in FIG. 2(a) to FIG. 2(b), the power of the hybrid service device 10 can be received via a POE (Power Over Ethernet) signal or a POC (Power Over Cable) signal. Accordingly, the power source is described in detail previously so that the details will be hereby omitted.

To embed the hybrid service device 20 in the wall, the first circuit board, the second circuit board and the third circuit board shall be installed in the shell, the size of the shell is like a gang wall box. Please refer to FIG. 3(a) to FIG. 3(e), FIG. 3(a) to FIG. 3(e) are schematic diagrams of the shell of the hybrid service system according to another embodiment of the invention. The shell of the hybrid service device 30 comprises an accommodating shell 310, a fixed ring 320 and a panel 330. The accommodating shell 310 comprises a front plate 311, a group of lateral plates 312 connected to the front plate 311 and a back plate 313 connected to the group of lateral plates 312. The back plate 313 and the lateral plates 312 defines a circuit board accommodating space 340. The lateral plates 312 comprise a first slide rail 321 and a second slide rail 322. The first slide rail 321 and the second slide rail 322 can let the first circuit board and the third first circuit board slide into the circuit board accommodating space 340 to install the control module, transmission functional module and the service module into the circuit board accommodating space 340. As previously described, the second circuit board 240 of the transmission functional module 230 can be connected to the third circuit connector 215 by the general cable to let the second circuit board 240 be flexibly disposed on the notches of the front plate 311 of the accommodating shell 310 instead of the circuit board accommodating space 340.

Furthermore, the back plate 313 of the accommodating shell 310 comprises an open part which is corresponded to the first wired network connector of the service module. When the accommodating shell 310 is embedded in the wall, the first signal transmission line is connected to the first wired network connector through the open part of the back plate 313. Additionally, the fixed ring 320 of the shell 30 is disposed on the front plate 311 the accommodating shell 310, to prevent the first circuit board and the third circuit board from dropping put. In order to fix the fixed ring 320 on the accommodating shell 310, the front plate 311 of the accommodating shell 310 comprises a set of flange 314 and the fixed ring 320 comprises a set of notches 3200 corresponded to the set of flange 314. When the fixed ring 320 is disposed on the accommodating shell 310, the set of notches 3200 of the fixed ring 320 are corresponded to the set of flange 314, such that the control module and the service module, installed in the circuit board accommodating space 340 of the accommodating shell 310, are prevented from dropping out.

The panel 330 of the shell 30 covers the front plate 311 and the fixed ring 320 of the accommodating shell 310. To display the working status of the hybrid service device, the control module (or the service module) can comprises a group of status display lamps 315 which are disposed on the first circuit board and through a group of holes 3202 of the fixed ring 320. The panel 330 comprises a group of open parts 331 of the display lamps which are corresponded to the status display lamps 315. When the control module (or the service module) selectively drives the group of status display lamps 315 to emit the light, the light can provide a status message about the hybrid service device for the user. In another embodiment, the panel 330 comprises a display panel 332 which is connected to the control module (or the service module) by a signal cable. The control module (or the service module) selectively drives the LCD display panel 332 according to the status of the hybrid service device.

Accordingly, the circuit board of the hybrid service device are cut into three pieces and installed into a shell which is like a gang wall box, such that the volume of the hybrid service device can be reduced and embedded into the wall easily. The hybrid service device can be connected to the network transmission line or the power line, so the invention is different from the wireless access point of the prior art which is placed in the outside space. Additionally, the power source of the hybrid service device can be combined with the network transmission signal by a POE (Power Over Ethernet) signal or a POC (Power Over Cable) signal, to reduce the line of the installation. Furthermore, the transmission functional module can be pluggably changed according to the difference of the wired/wireless transmission service to increase the flexibility.

In another embodiment, the invention of the hybrid service system comprises a central data confluence device 410 and a plurality of the hybrid service device 420 which are described as previously. Please refer to FIG. 4. FIG. 4 is a schematic diagram of the hybrid service system according to one embodiment of the invention. As shown in FIG. 4, each hybrid service device 420 is embedded in the wall and connected to the central data confluence device 410 by a first signal transmission line 430. Each hybrid service device can provide a wireless transmission service to the external wireless access equipment such as a notebook or a PDA. If the hybrid service device comprises the second wired network connecter which is described as previously, the second wired network connecter can provide a wired transmission service to the external access equipment through the second signal transmission line.

The central data confluence device 410 can receive the outside data and transform the outside data to a first format transmission signal. The first format transmission signal can be transmitted through the first signal transmission line 430. Each hybrid service device 420 selectively receives the first format transmission signal from the first signal transmission line. For example, when the first format transmission signal comprises a specific address information, only the specific hybrid service device receives the first format transmission signal. Otherwise, if the first format transmission signal is broadcast type, each hybrid service device receives the first format transmission signal. The first format transmission signal received by the hybrid service device, then the hybrid service device uses the format converter for selectively transforming the first format transmission signal to a second format transmission signal.

For example, when the first signal transmission line is an Ethernet transmission line and the hybrid service device 420 provides a WiFi wireless transmission service, the format converter of the hybrid service device 420 transforms the first format transmission signal (IEEE802.3 format) to a second format transmission signal (IEEE802.11x format). Then, the format converter transmits the second format transmission signal to the related wireless access equipment, such as a notebook or a PDA which has the wireless transmission function. However, if the hybrid service device 420 comprises a second wired network connecter which is connected to the external second signal transmission line, when the first signal transmission line and the second signal transmission line are Ethernet transmission lines, the service module directly transmits the first format transmission signal to the external second signal transmission line and external wired access equipment, such as a PC which has a wired network interface controller. Additionally, if the first signal transmission line is different from the second signal transmission line, the service module transforms the first format transmission signal to a third format transmission signal, then transmits the third format transmission signal to the external wired access equipment (such as a PC which has a wired network interface controller) by the signal transmission line.

Besides a building shall be installed only one central data confluence device by using the hybrid service system. The hybrid service system can receive the data from outside (such as the cable TV company or the network service company) and then transforms the data to a first format transmission signal. A room in a building just needs to be installed one hybrid service device, and the hybrid service device is connected to the central data confluence device through the first signal transmission line. The service module of every hybrid service device 420 selectively receives the first format transmission signal from the first signal transmission line. Then, the hybrid service device, receiving the first format transmission signal, selectively transforms the first format transmission signal to a second format transmission signal. According to the communication protocol of the external wired/wireless access equipment and the hybrid service device, the first format transmission signal or the second format transmission signal is transmitted and the first format transmission signal is transformed to a second format transmission signal. Otherwise, the external access equipment can transmit the data back to the hybrid service device. The hybrid service device transforms the data to a first format transmission signal according to the communication protocol and then transmits the format transmission signal back to the central data confluence device by the first signal transmission line. Finally, the central data confluence device transforms the first format transmission signal to a appropriate format and then transmits the appropriate format back to the cable TV company or the network service company To sum up, the hybrid service device can be directly connected to the network transmission line or the power line which is in the wall, such that the hybrid service system is not be installed at the outside space. Additionally, the power of the hybrid service device can be received via a POE (Power Over Ethernet) signal or a POC (Power Over Cable) signal. Accordingly, the power source and the network transmission signal can be combined to reduce the line of the installation. Furthermore, the transmission functional module can be pluggably changed according to the difference of the wired/wireless transmission service to increase the flexibility.

With the example and explanations above, the features and spirits of the invention will be hopefully well described. Those skilled in the art will readily observe that numerous modifications and alterations of the device may be made while retaining the teaching of the invention. Accordingly, the above disclosure should be construed a claims.

What is claimed is:

1. A hybrid service device, which can be embedded in a wall and connected with a first signal transmission line from the wall, the hybrid service device comprising:
   a control module disposed on a first circuit board comprising a CPU, a non-volatility memory device, a first circuit board connector and a socket, the non-volatility memory device is connected with the CPU for saving a instruction set, the CPU initializing the hybrid service device according to the instruction set and controlling the hybrid service device;
   a transmission functional module disposed on a second circuit board, the second circuit board pluggably disposed on the socket for letting the first circuit board and the second circuit board be substantially parallel and the control module electrically connected with the transmission functional module, the transmission functional module providing a wired/wireless transmission service for a wireless access equipment; and
   a service module disposed on a third circuit board comprising a format converter, a first wired network connector and a second circuit board connector, the second circuit board connector pluggably connected with the first circuit board connector for letting the service module electrically connected with the control module, the wired network connector providing a connector accommodating space for connecting a first signal transmission line and receiving a first format transmission signal from the signal transmission line, the format converter electrically connected with the wired network connector and selectively converting the first format transmission signal to a second format transmission signal;
   wherein the service module transmits the second format transmission signal to the control module through the second circuit board connector and the first circuit board connector, the control module controls the transmission functional module for transmitting the second format transmission signal to the wireless access equipment.

2. The hybrid service device of claim 1, wherein the service module further comprises a second wired network connector which is disposed on the third circuit board, the second wired network connector is connected to the second signal transmission line, the service module selectively transmits the first format transmission signal or a third format transmission signal to the signal transmission line.

3. The hybrid service device of claim 1, wherein the service module further comprises a power source convert device which is disposed on the third circuit board, the power source convert device receives the first format transmission signal from the first wired network connector and captures a source signal from the first format transmission signal, the source signal device generates a group of voltage signal according to the source signal for supplying with the hybrid service device.

4. The hybrid service device of claim 3, wherein the first format transmission signal is a POE (Power Over Ethernet) signal or a POC (Power Over Cable) signal.

5. The hybrid service device of claim 1, wherein the service module further comprises a power source convert device which is disposed on the third circuit board, the power source convert device is connected to a voltage source from the wall, the power source convert device generates a group of voltage signal according to the voltage source for supplying with the hybrid service device.

6. The hybrid service device of claim 1, the hybrid service device further comprising:
   a accommodating shell, the accommodating shell comprising a front plate, a group of lateral plates connected to the front plate and a back plate connected to the group of lateral plates, the back plate and the lateral plates defining a circuit board accommodating space, the lateral plates comprising a first slide rail and a second slide rail which can fix the first circuit board and the third circuit board for letting the control module, transmission functional module and the service module be installed in the circuit board accommodating space, wherein the back plate comprises a open part which is corresponded to the wired network connector of the service module, when the accommodating shell is embedded in the wall, the first signal transmission line is connected to the first wired network connector through the open part.

7. The hybrid service device of claim 6, further comprising a fixed ring which is disposed on the accommodating shell, for fixing the control module, transmission functional module and the service module in the circuit board accommodating space of the accommodating shell, wherein the front plate of the accommodating shell comprises a group of flange, the fixed ring comprises a group of notches which are corresponded to the group of flange, when the fixed ring is disposed on the accommodating shell, the group of flange is accommodated by the group of notches exactly.

8. The hybrid service device of claim 7, further comprising a panel for covering the front plate of the accommodating shell and the fixed ring, wherein the control module further comprises a group of status display lamps which are disposed on the first circuit board and through a group of holes of the fixed ring, the panel comprises a group of open parts of the display lamp which are corresponded to the status display lamps, the control module selectively drives the group of status display lamps according to the status of the hybrid service device.

9. The hybrid service device of claim 7, further comprising a panel for covering the front plate of the accommodating shell and the fixed ring, the panel comprising a LCD display panel which is connected to the control module of the first circuit board by a signal cable, the control module selectively driving the LCD display panel according to the status of the hybrid service device.

10. The hybrid service device of claim 1, wherein the control module further comprises a reset switch which is disposed on the first circuit board for resetting the hybrid service device when the reset switch is "ON".

11. The hybrid service device of claim 1, wherein the first signal transmission line is an Ethernet transmission line, a coaxial cable line, a twisted wire or a power line.

12. The hybrid service device of claim 1, wherein the service provided by the transmission functional module can be a WiFi service, a Bluetooth service, a RFID service, a Zeebee service, a 3G/3.5G transmission service, a Wimax service or other cable function such as voice over IP (VOIP) function.

13. The hybrid service device of claim 1, wherein the first circuit board connector and the second circuit board connector shall meet the PCI interface, USB interface or RS232 interface.

\* \* \* \* \*